United States Patent [19]

Corbett et al.

[11] Patent Number: 4,911,122
[45] Date of Patent: Mar. 27, 1990

[54] TUNED INTAKE AIR INLET FOR A ROTARY ENGINE

[75] Inventors: William D. Corbett; Benjamin L. Sheaffer, both of Fond du Lac

[73] Assignee: Brunswick Corporation, Skokie, Ill.

[21] Appl. No.: 290,466

[22] Filed: Dec. 27, 1988

[51] Int. Cl.[4] .............................................. F02B 53/00
[52] U.S. Cl. .................................. 123/216; 123/52 M; 418/86
[58] Field of Search ..................... 123/52 M, 216, 242; 418/86

[56] References Cited

U.S. PATENT DOCUMENTS

| | | | |
|---|---|---|---|
| 3,177,854 | 4/1965 | Garcea | 123/52 M |
| 3,370,575 | 2/1968 | Soubis | 123/216 |
| 3,967,593 | 7/1976 | Garside | 418/86 X |
| 4,000,721 | 1/1977 | Garside | 418/86 X |
| 4,497,287 | 2/1985 | Schleiermacher et al. | 123/52 M X |
| 4,515,115 | 5/1985 | Okubo | 123/52 M |

Primary Examiner—Michael Koczo
Attorney, Agent, or Firm—Andrus, Sceales, Starke & Sawall

[57] ABSTRACT

A tuned combustion air intake system for a rotary engine includes a plenum chamber mounted on the engine block and receiving cooling air discharged therefrom. Air from the plenum chamber is directed into an elongated outlet conduit of a extended length determined to provide an optimum pulsed air flow to the combustion air inlet to the carburetor. The extended length outlet conduit is wrapped at least partially around the plenum chamber to provide a compact construction particularly suitable to adapting the engine for use in an outboard motor. A supplemental air outlet from the plenum chamber to a downstream portion of the outlet conduit may be utilized to bypass a portion of the conduit to provide a change in the tuned length thereof for optimizing performance at difference engine speeds.

11 Claims, 2 Drawing Sheets

TUNED INTAKE AIR INLET FOR A ROTARY ENGINE

BACKGROUND OF THE INVENTION

The present invention relates to an intake air system for a rotary engine and, more particularly, to a plenum chamber and tuned intake air conduit which receives cooling air from the engine and directs it to the carburetor for mixture and intake with the fuel.

The rotary internal combustion engine has gained significant acceptance and is being used more widely in a variety of automotive applications. One of the major attractions of the rotary engine is its relative simplicity of construction as compared to more conventional reciprocating piston engines. In addition, advances in engineering technology have eliminated or substantially alleviated certain design and operational problems previously associated with rotary piston engines, such as rotor seal efficiency and life. As a result, additional applications for rotary engines are being evaluated. One particularly attractive application for the rotary engine is marine use and, in particular, in outboard boat motors.

As with any other internal combustion engine where a flow of intake air is induced by operation of the engine, the intake of combustion air in a rotary engine may also be induced by engine rotation. A rotary engine may also often be air cooled or may include a combination of air and water cooling. If air cooling is utilized, cooling air flow is also induced by engine rotation. For the sake of convenience and simplicity of engine construction, a single flow of air is utilized both for engine cooling and for combustion. Thus, after a flow of air is directed through the engine rotor chamber for cooling, it is directed into the carburetor, mixed with the fuel and passed into the combustion region of the rotor chamber.

It is well known in the art of internal combustion engines, including rotary piston engines, that an induced flow of intake combustion air is not provided at a constant flow volume. Instead, the typical intake and exhaust strokes of an engine cycle (whether a two-stroke or four-stroke cycle) will result in a pulsed flow of air. The pulsed flow results in waves which travel back and forth through the intake air system such that the desirable maximum intake air volume is not always available for the intake stroke. Thus, a "tuning" or balancing of the intake air flow may be undertaken to provide a high pressure wave front pushing a maximum volume of air through the carburetor and into the combustion chamber at the most efficient point in the intake stroke.

Intake air tuning generally requires the use of an intake air conduit of substantial length but, depending upon the average engine speed at which performance is desired to be optimized, the length of the intake air conduit may vary substantially. The tuning length providing the best average performance for the specific application is, therefore, chosen with some resulting sacrifice in performance at other speeds. Unfortunately, the optimization of intake air flow at relatively low speeds in a rotary engine requires a tuned inlet air conduit of considerable length. Where a rotary engine is used in an outboard motor, the conservation of space and the need to keep overall engine size to a minimum are key considerations. Thus, the rather considerable length of an optimally tuned intake air conduit poses a significant problem in an outboard motor application.

SUMMARY OF THE INVENTION

In accordance with the present invention the space occupied by a long tuned intake air conduit for a rotary engine is substantially reduced by combining the intake air conduit with an intake air plenum chamber and wrapping the intake air conduit around the chamber. The rigidity and strength of the assembly is also enhanced and the air flow may also be short circuited to change the tuned length for a change in engine speed.

In a preferred embodiment of the invention, an intake air plenum chamber is attached to the engine block and includes an air inlet adapted to receive cooling air exiting from the engine block and an air outlet adapted to be attached directly to an outlet conduit having an appropriately selected tuned length. The outlet conduit is preferably connected directly to the carburetor to supply inlet air for engine combustion. The outlet conduit from the plenum chamber is disposed to at least partially surround the plenum chamber to accommodate the substantially increased conduit length which is typically greater than the normal distance from the plenum chamber air outlet to the carburetor or other fuel supply inlet to the engine.

The plenum chamber preferably comprises an inner wall attached to the engine block, and outer wall disposed closely spaced from and generally parallel to the inner wall, and an enclosing side wall connecting the inner and outer walls. The plenum chamber may be mounted such that the air inlet is in direct registry with the cooling air outlet passage from the engine block. The air outlet from the plenum chamber is preferably disposed in the side wall at the point of attachment of the tuned outlet conduit. The outlet conduit, in the form of a cylindrical tube, is wrapped around the side wall of the plenum chamber and preferably disposed to lie in direct contact therewith. The other end of the conduit is attached to the engine carburetor.

In an alternate embodiment, the plenum chamber may be provided with a supplemental air outlet to the outlet conduit located downstream of the normal air outlet. By utilizing control means for selectively opening and closing the supplemental air outlet, the tuned length of the conduit may be varied. A control means is preferably constructed to respond to the change in engine speed.

DETAILED DESCRIPTON OF THE PREFERRED EMBODIMENTS

Figure 1:
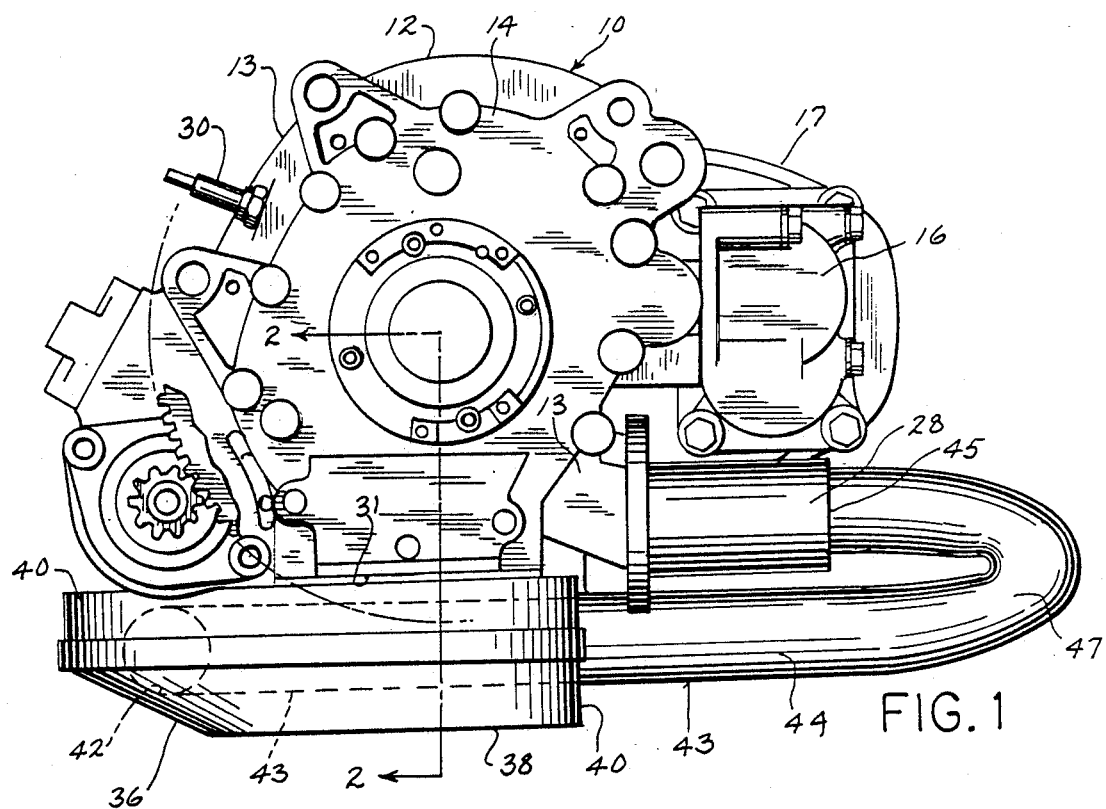
FIG. 1 is a top plan view of a single rotary engine utilizing the tuned intake air system of the present invention.
Figure 2:
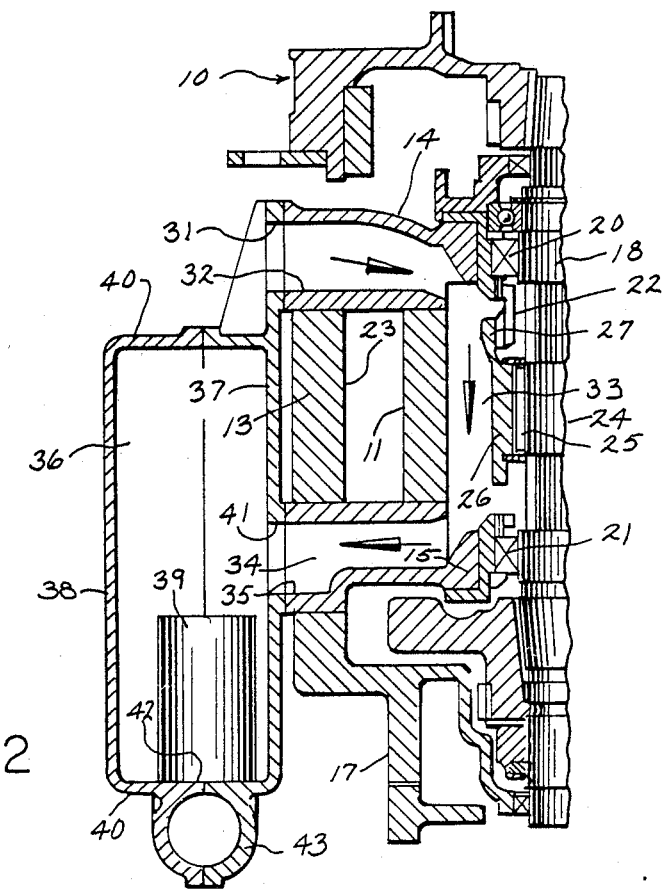
FIG. 2 is a partial vertical section through the engine taken on line 2—2 of FIG. 1.

Referring to FIGS. 1 and 2, a rotary engine 10 of the type utilizing a single rotor 11 is adapted particularly for use in an outboard boat motor. The engine block 12 comprises an intermediate rotor housing 13, an upper housing 14, and a lower housing 15. The upper and lower housings 14 and 15 are attached to opposite faces of the rotor housing 13. Each of the housing members preferably comprises an aluminum or aluminum alloy casting for corrosion resistance and light weight. Some or all of the castings may be made in two pieces.

An exhaust manifold 16 is attached to the outside of the engine block 12 and extends downwardly from the rotor housing 13 to the bottom of the lower housing 15. When utilized in an outboard motor construction, the exhaust manifold 16 and lower housing 15 are attached to a lower adaptor plate 17 which provides a transition region for engine exhaust discharge and cooling water supply, as well as an enclosure for the lower portion of the engine.

Each of the housing members 13-15 comprising the engine block is provided with a generally centrally located opening to accommodate the assembly of the rotor 11 and a rotor shaft 18. The rotor shaft extends vertically through the engine block and is journaled for rotation therein on upper and lower bearings 20 and 21, respectively, mounted in the central openings in the upper and lower housings 14 and 15. A stationary gear 22 is attached to the upper housing 14 concentrically with the upper bearing 20 and with the axis of rotation of the rotor shaft 18.

The rotor housing 13 includes an enlarged central opening which defines a rotor chamber 23 having a characteristic epitrochoidal configuration which is conventional in rotary engine construction. The rotor shaft 18 extends vertically through the engine block and includes an enlarged cylindrical eccentric portion 24 disposed within the rotor chamber 23. The rotor 11 is rotatably mounted on the cylindrical eccentric 24 by a needle bearing assembly 25 carried on a cylindrical sleeve 26 attached to the inner cylindrical surface of the rotor 11. The cylindrical sleeve 26 includes an integral upwardly extending rotor gear 27 adapted to engage the downwardly extending stationary gear 22. The diameter of the rotor gear 27 is substantially larger than the diameter of the stationary gear 22, thereby providing the eccentric rotary movement of the rotor 11 within the rotor chamber 23 in a manner conventional to the operation of a rotary engine.

A rotary engine may also be constructed with twin rotors, each operating in a separate rotor housing. In addition to obvious differences including a lengthened rotor shaft and exhaust manifold, a twin rotor engine also requires a center housing member between the two rotor housings. With either a twin rotor engine or a single rotor engine, as shown, adaptation of the engine to an outboard motor requires attachment of the lower end of the rotor shaft to the upper end of an outboard motor driveshaft (not shown). The driveshaft extends downwardly into operative connection with a lower gear case and propeller in the conventional manner.

In operation of the engine 10, the rotor 11 turns in its eccentric path within the rotor chamber 23 (clockwise in FIG. 1) to provide a conventional 4-stroke working cycle. The rotor has three lobes such that stages of three separate cycles, displaced by 120° occur simultaneously. In a typical cycle, a mixture of combustion air and fuel is drawn into the rotor chamber through a carburetor 28 attached to the outer wall of the rotor housing 13. The mixture is compressed by a successive decrease in volume between one face of the rotor and the rotor chamber to the point of ignition from a spark plug 30. Continuing rotation results in the discharge of exhaust gases through the exhaust manifold 16, completing the 4-stroke cycle. Engine cooling water is supplied via a cooling water jacket surrounding the exhaust manifold 16 from which it is circulated by an engine driven water pump through the engine block via water passages in the rotor housing 13 and upper and lower housings 14 and 15, respectively. The cooling water passages in the housings lie generally in the region of engine ignition and exhaust, i.e. generally the semicircumferential portion of the engine including the ignition and exhaust regions of the rotor chamber. Thus, cooling water is preferentially supplied to the areas of the engine block typically experiencing the highest temperature. Details of the construction of the cooling water system are set forth in commonly-owned, co-pending application Ser. No. 07/226,686, filed Aug. 1, 1988.

Supplemental air cooling is provided for the engine 10 by inducing a flow of outside air through the engine block by rotation of the engine. In general, cooling air is supplied to the region of the engine block not cooled directly by water and including generally the intake and compression areas. Intake air may be brought in via either the upper or the lower housing 14 or 15, passed through the rotor housing 13, and exhausted via the other housing member 14 or 15. Cooling air from the engine is then used for combustion air by directing it to the carburetor 28 for mixture with engine fuel, in accordance with the system of the present invention to be described.

Cooling air is supplied to the engine through a cooling air opening 31 in the outer wall of the upper housing 14. From the opening 31, cooling air flows through a cooling air entry passage 32 in the upper housing 14, through the open interior therein and into a rotor chamber air passage 33 between the rotor 11 and the rotor shaft 18. From the rotor chamber 23, the cooling air flows through the inner opening in the adjacent lower housing 15 into a cooling air exit passage 34 therein and out of the engine block via a cooling air exit opening 35 in the outer wall of the lower housing 15.

Cooling air exiting from the engine via exit opening 35 is directed into a plenum chamber 36 attached to the engine block by an inner chamber wall 37. The plenum chamber 36 is defined by an outer wall 38 generally parallel to and closely spaced from the inner wall 37, and an enclosing side wall 40 interconnecting the inner and outer walls. Cooling air from the engine passes directly into the plenum chamber 36 via an air inlet 41 in direct registry with the cooling air exit opening 35 in the lower housing 15. The plenum chamber provides a relatively large open interior to provide for expansion of the cooling air entering it and some attenuation of the pulsed flow of cooling air induced by engine rotation.

From the plenum chamber 36, cooling air is supplied to the carburetor 28 for combustion via an outlet conduit connecting the plenum chamber and the carburetor. In the embodiment shown in FIGS. 1 and 2, the plenum chamber 36 includes an air outlet 42 in the lower surface of the side wall 40 to which is attached the upstream end of the outlet conduit 43. A tubular sleeve 39 extends from the open interior of the plenum chamber 36 to the air outlet 42 to direct the flow of air thereinto. With the air outlet 42 located in the side wall 40 remote from the carburetor 28, an extended length outlet conduit 43 is provided which extends substantially along the lower surface of the side wall 40 and bends upwardly to its connection with the carburetor at the level of the rotor housing 13. The extended outlet conduit length allows the pulsed air flow to be tuned to provide an optimum intake air flow to the carburetor. The tubular sleeve 39 may extend any selected distance into the plenum chamber or may be eliminated, thus providing an additional means of varying the total length of the outlet conduit 43.

Figure 3:
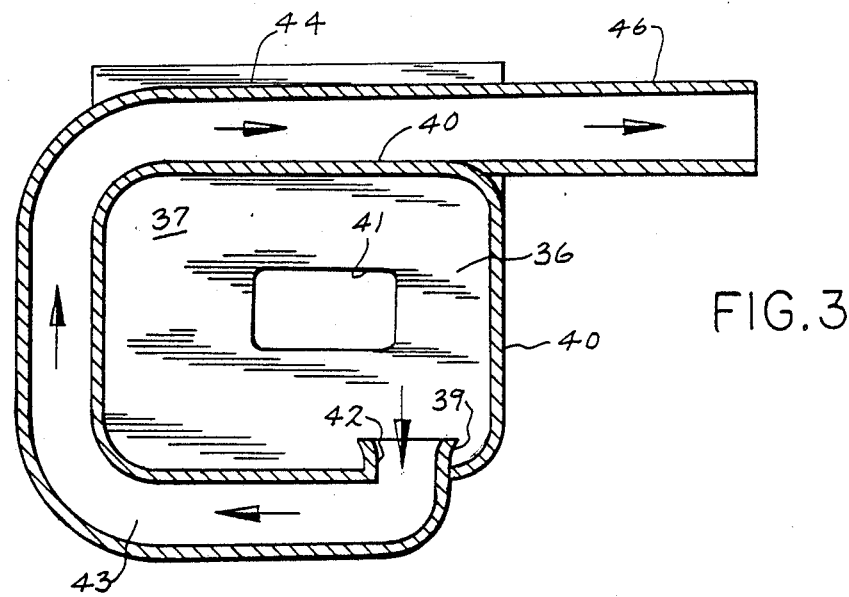
FIG. 3 is a sectional side elevation of a first alternate embodiment of the plenum chamber and tuned outlet conduit assembly of the present invention.

Referring to the FIG. 3 embodiment, the plenum chamber 36 includes an air outlet 42 in the lower surface of the side wall 40 to which is attached the upstream end of the outlet conduit 43. The outlet conduit 43 comprises a generally cylindrical length of tubing 44 which is wrapped substantially around the side wall 40 of the plenum chamber in direct contact therewith. In particular, the outlet conduit 43 extends along the lower face of the side wall 40, upwardly along one side face thereof, and continuing along the upper face of the side wall 40 to an integral tangent portion 46 extending from the plenum chamber to the carburetor 28. The downstream end of the tangent portion 46 includes an elbow portion 47 connected to the combustion air inlet 45 to the carburetor 28.

The length of the outlet conduit 43 is substantially greater than the direct distance from the cooling air exit opening 35 in the engine block to the combustion air inlet 45 in the carburetor. This selected length is based primarily on the principal intended use of the engine and the normal speed for such use. In the FIG. 3 embodiment, the intermediate length of the outlet conduit 43 provides optimum tuning of the combustion air flow at average cruising speeds. As previously indicated, optimized tuning length provides a wave front which will force a maximized volume of air into the rotor chamber 23, via the carburetor, coincident with the intake stroke of the operating cycle.

Figure 4:
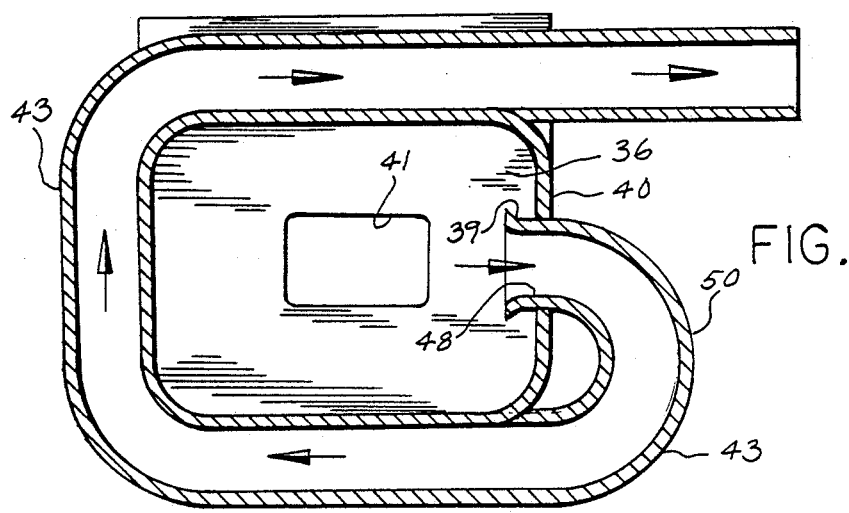
FIG. 4 is a sectional side elevation similar to FIG. 3 showing a second alternate embodiment.

The alternate embodiment of FIG. 4 includes an air outlet 48 from the plenum chamber 36 on one vertical face of the side wall 40 to provide an extended length conduit 43. The additional length is provided by a semi-circular bend 50 resulting in an outlet conduit which nearly completely circumscribes the plenum chamber. This increased length of the outlet conduit 43 would be utilized, for example, in an outboard motor intended for lower speed and heavier load operation.

Figure 5:
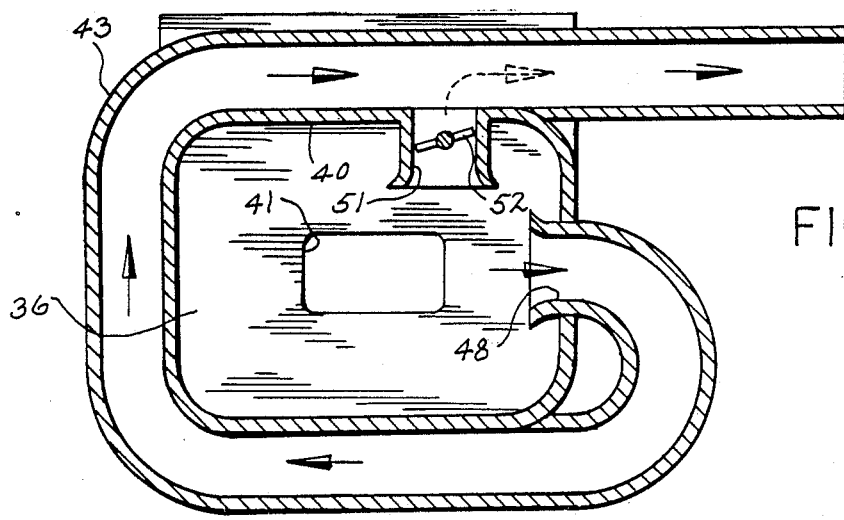
FIG. 5 is a sectional side elevation similar to FIGS. 3 and 4 showing a third embodiment.

In FIG. 5, there is shown another alternate embodiment, similar to that shown in FIG. 4, but including means for selectively shortening the conduit length to adapt the assembly for more efficient operation at high speeds. A supplemental air outlet 51 is disposed in the upper face of the side wall 40 and opens directly into the outlet conduit in direct contact therewith. A control valve 52 is disposed in the supplemental air outlet 51 such that the air outlet may be selectively opened to allow air exiting the plenum chamber to completely bypass the portion of the outlet conduit encircling the chamber. The control valve 52 is preferably operative in response to engine speed and may be operated directly by the throttle control, or a separate vacuum or electric control system or the like. Typically, the supplemental air outlet 51 would be opened at high speed to bypass a major portion of the outlet conduit length. As a general principal, a shorter tuned length provides better performance at high speeds.

Disposing the necessarily long outlet conduit 43 around the plenum chamber 36 allows the overall size of the engine to be maintained within the compact confines needed for an outboard motor application. In addition, placing the outlet conduit in contact with the wall of the plenum chamber enhances its structural rigidity. The plenum chamber and extended length outlet conduit also provide some cooling of the air heated by passage through the engine, thereby promoting combustion efficiency.

We claim:

1. In a rotary internal combustion engine having an engine block including an interior rotor chamber and chamber-enclosing end members on opposite sides of the rotor chamber, a rotor shaft extending through the engine block, a rotor operatively connected to the rotor shaft for rotary movement within the rotor chamber, a cooling air passage in each end member for circulating a flow of air induced by rotation of the rotor from outside the engine block through the rotor chamber, one of said air passages comprising a cooling air entry passage and the other air passage comprising a cooling air exit passage, and a fuel supply inlet to the rotor chamber adapted to receive air for combustion from said cooling air exit passage, an improved assembly for providing a balanced flow of combustion air to the fuel supply inlet comprising:

a plenum chamber attached to the engine block, said plenum chamber including an air inlet adapted to receive air from said cooling air exit passage and an air outlet for the discharge of air; and, an outlet conduit connecting said air outlet and the fuel supply inlet, said conduit disposed to partially surround the plenum chamber to provide a conduit length substantially greater than the distance from the cooling air exit passage to the fuel supply inlet.

2. The invention as set forth in claim 1 wherein said plenum chamber includes an inner wall attached to the engine block, and outer wall disposed closely spaced from and generally parallel to the inner wall, and an enclosing side wall interconnecting said inner and outer walls.

3. The invention as set forth in claim 2 wherein said plenum chamber is mounted such that the air inlet is in direct registry with the cooling air exit passage.

4. The invention as set forth in claim 3 wherein the air outlet from the plenum chamber is disposed in the side wall.

5. The invention as set forth in claim 4 wherein said outlet conduit comprises a cylindrical tube disposed to lie in direct contact with the side wall of the plenum chamber.

6. The invention as set forth in claim 5 wherein said outlet conduit has a length sufficient to substantially circumscribe said side wall.

7. The invention as set forth in claim 5 wherein said outlet conduit includes an integral sleeve portion extending through the plenum chamber side wall and into the interior of the chamber.

8. The invention as set forth in claim 1 including a carburetor operatively attached to said fuel supply inlet and adapted to receive combustion air from said outlet conduit.

9. The invention as set forth in claim 1 including a supplemental air outlet in said plenum chamber in communication with said outlet conduit downstream of said air outlet.

10. The invention as set forth in claim 9 including control means for selectively opening and closing said supplemental air outlet.

11. The invention as set forth in claim 10 wherein said control means is responsive to engine speed.

* * * * *